ceptacle from which the catalyst is subsequently transferred into the polymerisation receptacle.

The catalysts thus prepared render it possible to polymerise ethylene continuously or discontinuously under pressures lower than 50 atmospheres with the production of a solid polymeric product. Pressures scarcely higher than atmospheric pressure may be employed, but it is preferable to operate between 10 to 50 atmospheres in order to obtain technically advantageous rates of polymerization. It is possible to work at pressures higher than 50 atmospheres, but this does not result in any particular advantage, and on the contary difficulties may then be encountered in eliminating the heat produced by the reaction.

2,884,409

POLYMERISATION OF ETHYLENE

Gilbert M. M. Bo, Andre Fournet, Jean Auguste Phelisse, and Edouard Fichet, Lyon, France, assignors to Societe des Usines Chimiques Rhone-Poulenc, Paris, France, a French body corporate No Drawing. Application April 12, 1957
Serial No. 652,340

Claims priority, application France April 19, 1956

9 Claims. (Cl. 260—94.9)

This invention is for improvements in or relating to the polymerisation of ethylene.

It is known to polymerise ethylene in the presence of a mixture of aluminium chloride and aluminium, the respective proportions of which vary from 10:1 to 1:1, at temperatures of from 20° to 300° C. under pressures of from 50 to 80 atmospheres. In all cases, only more or less viscous oils have been obtained.

It is the object of the present invention to provide a process for the polymerisation of ethylene which yields exclusively or substantially exclusively solid polymer.

The process of the present invention essentially comprises effecting the polymerisation of ethylene in the presence, as catalyst, of a product formed by heating aluminium with aluminium chloride.

The reaction between the aluminium chloride and aluminium can be carried out either in the absence of any diluent or in the presence of a hydrocarbon which is not polymerisable under the conditions of the reaction, such as a saturated aliphatic, cyclanic, cyclenic, or aromatic hydrocarbon. The hydrocarbons which may be employed include, for example, hexane, heptane, decahydronaphthalene, cyclohexane, cyclohexene and benzene. The hydrocarbons employed as diluents must be used in the pure state and more especially they must not be contaminated with sulphur-containing impurities.

The preparation of the catalyst is carried out at temperatures which may range up to about 300° C. If the working temperature is higher than the boiling point of the diluent when such is employed, or if it is higher than the boiling point of the aluminium chloride in the absence of diluent, it is necessary to work under pressure. Thus, it is advantageous to work at temperatures of from 200° to 220° C., under (when a diluent is employed) a pressure corresponding to the vapour pressure of the diluent at these temperatures. Under these conditions, reaction for one hour is generally sufficient to give a satisfactory catalyst.

The respective proportions of aluminium and aluminium chloride may vary within wide limits. It is possible to use $Al/AlCl_3$ ratios of, for example, from 1:4 to 2:1.

The aluminium employed for the preparation of the catalyst is preferably pure aluminium in finely divided form or in the form of flakes or sheets.

The reaction of the aluminium with the aluminium chloride may be accelerated by agitating the mixture vigorously. If the aluminium is not finely divided e.g. is in the form of flakes, it is possible to effect the operation in the presence of solid, spherical or other suitable shaped objects composed of a material which is not attacked by the reactants, for example, stainless steel balls, which assist the contact by mechanically cleaning the surface of the aluminium on which the products of reaction are deposited.

The catalyst may be prepared in the same receptacle as that employed for the polymerisation, or in a special receptacle from which the catalyst is subsequently transferred into the polymerisation receptacle.

The polymerisation temperatures may range from temperatures slightly higher than room temperatures to about 150° C. according to the activity of the catalyst. In practice, when the discontinuous (batch) method of operation is adopted, it is unnecessary to exceed 110° C. and the optimum polymerisation temperature is between 90° and 110° C. If the continuous method is adopted, it is preferable to work at high temperatures, for example at about 140° C.

The polymerisation is carried out in a receptacle which withstands pressure and which is provided with an agitator. The polymerisation may be carried out either in the presence or in the absence of diluents. The use of a diluent is preferred.

Where the operation is carried out in the presence of diluents, these are preferably the same as those employed in the preparation of the catalysts, more especially hexane, heptane, decahydronaphthalene, cyclohexane, cyclohexene and benzene. The diluents facilitate intimate contact between the ethylene and the catalyst and permit of polymers being obtained in a handleable form, thus facilitating the discharge of the reaction mixture from the polymerisation receptacle.

The catalyst is employed either in the dry state or in the form of a suspension in the diluent in which it may have been prepared. The ethylene employed may be a technical grade as it is not necessary to effect complete elimination of the usual impurities.

The crude polyethylene leaving the polymerisation apparatus takes the form of a thick mass, the consistency of which varies in accordance with the concentration in the diluent, or in the form of a hard greyish mass when the polymerisation has been carried out in the absence of diluent. It contains the catalyst, from which it can be freed by various methods, for example by treating the polymer under heat with methanol containing hydrochloric acid, or by dissolving the polymer in a solvent under heat, filtering the solution and then evaporating off the solvent. The various methods may also be combined.

By varying the ratio of aluminium to aluminium chloride and by varying the polymerisation conditions, i.e. the temperature and the pressure, it is possible to obtain a range of solid polymers which differ in their physical characteristics.

The invention is illustrated by the following example.

Example

Into a stainless steel autoclave having a capacity of 500 cc. there are introduced 100 cc. of benzene, 4 g. of sublimated aluminium chloride, 2.7 g. of flaked aluminium and 6 stainless steel balls 10 mm. in diameter. The autoclave is vigorously agitated for 1 hour at 200° C. and then allowed to cool. Ethylene is then introduced until a pressure of 30 kg./cm.$^2$ is reached. Polymerisation starts at room temperature. The reaction is continued by heating at 100° C. for 1 hour. The autoclave is allowed to cool and the polyethylene formed, impregnated with benzene, is extracted. The benzene is driven off and the catalyst is removed by boiling with methanol saturated with hydrochloric acid, followed by dissolution with heat in cyclohexane, filtration and reprecipitation by cooling. 14 g. of solid white polymer having the technical properties required for the standard applications of polyethylenes are obtained.

We claim:

1. A process for the production of a solid ethylene polymer which comprises heating ethylene to a temperature up to 150° C. under a pressure of 10–50 atmospheres in the presence of a catalyst made by heating aluminium with aluminium chloride in a weight ratio between 1:4 and 2:1 to a temperature of at most 300° C., in the absence of hydrocarbons, including ethylene, which polymerise under these conditions, until the aluminium and aluminium chloride have reacted together.

2. A process for the production of a solid ethylene polymer which comprises heating ethylene to a temperature up to 150° C. under a pressure of 10–50 atmospheres in the presence of a catalyst made by heating aluminium with aluminium chloride in a weight ratio between 1:4 and 2:1 to a temperature of 200–300° C., in the absence of hydrocarbons, including ethylene, which polymerise under these conditions, until the aluminium and aluminium chloride have reacted together.

3. A process for the production of a solid ethylene polymer which comprises heating ethylene to a temperature up to 150° C. under a pressure of 10–50 atmospheres in the presence of a catalyst made by heating aluminium with aluminium chloride in a weight ratio between 1:4 and 2:1 to a temperature of 200–220° C., in the absence of hydrocarbons, including ethylene, which polymerise under these conditions, until the aluminium and aluminium chloride have reacted together.

4. A process for the production of a solid ethylene polymer which comprises heating ethylene to a temperature up to 150° C. under a pressure of 10–50 atmospheres in the presence of a catalyst made by heating aluminium with aluminium chloride in a weight ratio between 1:4 and 2:1 to a temperature of at most 300° C., in the absence of hydrocarbons, including ethylene, which polymerise under these conditions and in the presence of an inert hydrocarbon diluent selected from the group which consists of saturated aliphatic, saturated cycloaliphatic, cyclo-olefinic and aromatic hydrocarbons, until the aluminium and aluminium chloride have reacted together.

5. A process for the production of a solid ethylene polymer which comprises heating ethylene to a temperature up to 150° C. under a pressure of 10–50 atmospheres in the presence of a catalyst made by heating aluminium with aluminium chloride in a weight ratio between 1:4 and 2:1 to a temperature of 200–220° C., in the absence of hydrocarbons, including ethylene, which polymerise under these conditions and in the presence of an inert hydrocarbon diluent selected from the group which consists of saturated aliphatic, saturated cycloaliphatic, cyclo-olefinic and aromatic hydrocarbons, until the aluminium and aluminium chloride have reacted together.

6. Process according to claim 1 which comprises heating the ethylene with the catalyst in the presence of an inert diluent selected from the group which consists of saturated aliphatic, saturated cycloaliphatic, cyclo-olefinic and aromatic hydrocarbons.

7. Process according to claim 5 which comprises heating the ethylene with the catalyst in the presence of an inert diluent selected from the group which consists of saturated aliphatic, saturated cycloaliphatic, cyclo-olefinic and aromatic hydrocarbons.

8. Process according to claim 6 which comprises heating the ethylene with the catalyst in a batch polymerisation process to a temperature of 90°–110° C.

9. Process according to claim 6 which comprises heating the ethylene with the catalyst in a continuous polymerisation process to a temperature of 140° C.

References Cited in the file of this patent

UNITED STATES PATENTS

| 1,877,664 | Howes | Sept. 13, 1932 |

FOREIGN PATENTS

| 874,215 | Germany | Apr. 20, 1953 |